United States Patent
Dibbern et al.

(10) Patent No.: US 6,472,042 B1
(45) Date of Patent: *Oct. 29, 2002

(54) HIGHLY FILLED THERMOPLASTIC COMPOSITIONS

(75) Inventors: Joseph A. Dibbern, Brazoria, TX (US); Stephen R. Betso, Horgen (CH); David G. Bertelsman, Missouri, TX (US); Martin J. Guest, Lake Jackson, TX (US)

(73) Assignee: Dow Global Technologies Inc., Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/700,141

(22) Filed: Aug. 20, 1996

Related U.S. Application Data

(63) Continuation-in-part of application No. 08/194,236, filed on Feb. 10, 1994, now Pat. No. 5,576,374.

(51) Int. Cl.[7] ............... B32B 5/02; C08J 3/18
(52) U.S. Cl. ............ 428/95; 428/96; 428/523; 524/581; 524/423; 524/425; 524/445; 524/443; 524/27; 524/9; 524/427
(58) Field of Search ............... 524/581, 423, 524/425, 445, 27, 9, 443, 427; 428/500, 523, 96, 95

(56) References Cited

U.S. PATENT DOCUMENTS

| | | | |
|---|---|---|---|
| 4,191,798 A | 3/1980 | Schumacher et al. | 428/95 |
| 4,263,196 A | 4/1981 | Schumacher et al. | 428/95 |
| 4,335,034 A * | 6/1982 | Zuckerman et al. | 524/423 |
| 4,395,519 A | 7/1983 | Minami et al. | 525/240 |
| 4,403,007 A | 9/1983 | Coughlin | 428/95 |
| 4,430,468 A | 2/1984 | Schumacher | 524/109 |
| 4,469,752 A | 9/1984 | Yoshimura et al. | 428/475.8 |
| 4,634,740 A | 1/1987 | Fujita et al. | 525/240 |
| 4,734,328 A | 3/1988 | Kohyama et al. | 428/336 |
| 4,748,206 A | 5/1988 | Nogiwa et al. | 525/88 |
| 4,764,404 A | 8/1988 | Genske et al. | 428/35 |
| 4,829,125 A | 5/1989 | Yeo et al. | 525/194 |
| 5,011,719 A | 4/1991 | Gehrke et al. | 428/35.7 |
| 5,030,506 A | 7/1991 | Yamawaki et al. | 428/216 |
| 5,071,686 A | 12/1991 | Genske et al. | 428/35.7 |
| 5,115,030 A | 5/1992 | Tanaka et al. | 525/240 |
| 5,206,075 A | 4/1993 | Hodgson, Jr. | 428/216 |
| 5,266,392 A | 11/1993 | Land et al. | 428/224 |
| 5,268,220 A | 12/1993 | Tajima et al. | 428/220 |
| 5,272,236 A | 12/1993 | Lai et al. | 526/348.5 |
| 5,278,272 A | 1/1994 | Lai et al. | 526/348.5 |
| 5,328,734 A | 7/1994 | Morese-Seguela et al. | 428/36.92 |
| 5,358,792 A | 10/1994 | Mehta et al. | 428/516 |
| 5,385,972 A * | 1/1995 | Yamamoto et al. | 524/579 |
| 5,389,448 A | 2/1995 | Schirmer et al. | 428/517 |
| 5,391,618 A | 2/1995 | Yamamoto | 525/88 |
| 5,414,040 A | 5/1995 | McKay et al. | 524/576 |
| 5,416,148 A | 5/1995 | Farah et al. | 524/409 |
| 5,468,808 A | 11/1995 | Peacock | 525/240 |
| 5,484,838 A | 1/1996 | Helms et al. | 524/496 |
| 5,571,864 A | 11/1996 | Bates et al. | 525/88 |
| 5,576,374 A * | 11/1996 | Betso et al. | 524/451 |
| 5,654,364 A | 8/1997 | Bates et al. | 525/98 |
| 5,667,800 A | 9/1997 | De Vringer | 424/450 |
| 5,707,732 A * | 1/1998 | Sonoda et al. | 428/357 |

FOREIGN PATENT DOCUMENTS

| | | |
|---|---|---|
| EP | 0 230 113 A2 | 11/1986 |
| JP | 54-143362 | 11/1979 |
| JP | 62-121709 | 6/1987 |
| JP | S64-16848 | 1/1989 |
| JP | 52-109580 | 9/1997 |
| WO | 96/06132 | 2/1996 |
| WO | 98/27143 | of 1998 |

* cited by examiner

*Primary Examiner*—D. Lawrence Tarazano

(57) ABSTRACT

Filled thermoplastic compositions useful e.g., as sound-deadening sheeting for automotive carpet are obtained by blending at least one ethylene/α-olefin interpolymer; about 40–95 percent by weight of filler; and optionally elastomeric polymers.

20 Claims, No Drawings

HIGHLY FILLED THERMOPLASTIC COMPOSITIONS

RELATED APPLICATIONS

This application is a continuation in part of application Ser. No. 08/194,236, filed Feb. 10, 1994, now U.S. Pat. No. 5,576,374. This application is related to U.S. Ser. No. 07/945,034, filed Sep. 15, 1992, now abandoned; U.S. Ser. No. 08/045,330, filed Apr. 8, 1993, now allowed; Ser. No. 08/469,300, filed Jun. 9, 1995, now allowed; Ser. No. 08/468,695, now allowed; Ser. No. 08/735,859, filed Oct. 23, 1996, pending; and Ser. No. 08/729,709, now allowed.

BACKGROUND OF THE INVENTION

1. Field of the Invention

This invention relates to highly filled compositions of ethylene/$\alpha$-olefin interpolymers.

2. Description of the Prior Art

The use of processing oils and other plasticizers with natural rubber or synthetic rubber-like compounds containing sulfur, accelerators, carbon black and other additives customarily used in the rubber industry is well known. In some instances in order to obtain very high tensile strength values, fillers are omitted. On the other hand, it is known that styrene/butadiene rubber (SBR) compounds, such as are used to adhere jute secondary backings to carpets, can readily hold up to 80% by weight or more of calcium carbonate filler. Vulcanization or curing enhances blend strength.

For thermoplastic elastomeric uses, it is desirable both to avoid curing and to employ fillers to reduce blend costs, as well as to increase blend density.

Industrial noise and its control are items of increasing concern to governmental, environmental, and industrial organizations. Governmental agencies are establishing noise limits to which workers may be exposed to protect their health.

From an aesthetic standpoint, noise also present problems. Advertisements for "quiet riding" automobiles are ubiquitous. Manufactures are attempting to make other vehicles quiet as well-including campers, trailers, trucks, and off-road-use farm vehicles.

It has long been known that interposing mass between a sound source and the area to be kept quiet is an effective means for attaining sound deadening. A sheet of lead is thin, flexible, often highly effective, but costly. The challenge, then, is to attain dense, thin, flexible sheet which can be interposed between a source of noise and the area to be quieted.

Sheets of thermoplastics or of rubber-like materials have long been used as sound-deadening means. To make the sheets flexible, dense, strong, and inexpensive has posed a challenge to compounders for many years. For some used, such as automobile carpet underlayment, the sound-deadening sheet must also be moldable.

Schwartz U.S. Pat. No. 3,904,456, is related to a method for inhibiting transmission of airborne noise by interposing in the air space between the noise source and the location to be insulated a thin, dense, normally self-supporting film or sheet composed essentially of from about 10 to about 40% by weight of ethylene/vinyl acetate copolymer having an average vinyl acetate content of from about 10 to about 42% by weight and a glass transition temperature of at least about 30° C., below the average ambient temperature in the air space, and from about 60% to about 90% by weight of inorganic filler materials, such as sulfates, carbonates, oxides, etc. of barium, calcium, etc., effective to produce an overall density greater than at least 2 grams per cubic centimeter.

German Patent Application No. 2,319,431 discloses sound-deadening composites suitable for use in automobiles which consist of a highly filled polymer sheet (for example, 300–1200 or even up to 1500 parts of filler per 100 parts of polymer) which on its backside is provided with a filler material sheet, e.g., a polymer foam. Suitable polymers for use are disclosed to be terpolymers of ethylene, propylene and a nonconjugated diene (EPMD), polyvinyl chloride (PVC), mixed polymers of ethylene and vinyl acetate (EVA), styrene-butadiene mixed polymers (SBR) and mixtures of these materials with thermoplastic polymers, such as polystyrene and polyolefins.

Rosenfelder U.S. Pat. No. 3,203,921 discloses the use of compositions consisting essentially of 73–88% by weight of a homo- or copolymer of ethylene (which can be ethylene/vinyl acetate or ethylene/ethyl acrylate copolymer), 2–7% by weight of an aliphatic paraffinic hydrocarbon mineral oil and 10–20% by weight of a mineral filler (for example, calcium carbonate, barium sulfate, etc.) for preparing blow-molded objects such as dolls.

Schumacher and Yilo U.S. Pat. No. 4,191,798 discloses compositions consisting essentially of 5–50% by weight of ethylene interpolymer (e.g. ethylene/vinyl acetate copolymer:, 2–15% by weight of processing oil, and 50–90% by weight of filler. These compositions have utility when formed a sound-deadening sheet and to have particular utility as a backside coating on automotive carpets.

Belgian Patent No. 694,890 entitled "Surface Hardening Plastics Based on Ethylene/Propylene Elastomers" discloses blends of ethylene/propylene copolymer, mineral oil, filler, and a drying oil for use as a surface hardening mastic, where the copolymer contains 25–75 mole percent propylene (about 33–82 weight percent). These blends are claimed to be useful in sealing mastics in buildings and metal constructions.

Japanese Patent Publication No. 042-235/78 (Japanese Application No. 118114/76) discloses hot melt compositions comprising an ethylene/$\alpha$-olefin copolymer, a hydrocarbon oligomer, a hindered ester, 1–10 percent by weight of colloidal silica and microcrystalline wax. Although these compositions contain mainly olefinic compounds, it is asserted that flexibility and internal loss are maintained while adhesion to olefinic type film is prevented. The compositions are disclosed to be useful for vibration damping.

U.S. Pat. No. 3,963,802 is related to blends of certain ethylene copolymers and segmented copolyether ester elastomers in specific proportions. Suitable ethylene copolymers are disclosed as those having one or more comonomers selected from the group consisting of alpha-olefins and nonconjugated diolefins, said copolymer having a melting point not greater than 83° C. A suitable copolyether is disclosed as those having one or more comonomers selected from the group consisting of 15–95 percent by weight of short chain ester units and 5–85 percent by weight of long chain ester units, said copolyether ester having a melting point of at least 100° C. It is disclosed that the copolyether ester elastomer is made softer, with retention of toughness and other physical properties, by blending with the ethylene copolymer. It is further disclosed that from 1 to 30 percent by weight of fillers and pigments (e.g. very finely divided silica, alumina, or calcium carbonate) may be incorporated in the blend to increase the toughness and temperature resistance.

U.S. Pat. No. 4,438,228 (Schenck) discloses and claims compositions consisting essentially of an ethylene/alpha-olefin copolymer, at least one plasticizer (e.g., an oil), and 40–90 percent of filler. For example, Schenck tried to fill a linear low density polyethylene (a heterogeneously branched polyethylene—Dowlex* 2045, made by The Dow Chemical Company) at levels greater than 60 percent, but the filled formulation did not flux (melt mix) without the presence of plasticizer. We have now discovered that for certain types of polyethylene, no plasticizer need be added at all in order for highly filled systems to be melt processable.

SUMMARY OF THE INVENTION

According to the present invention, there is provided a composition consisting essentially of (a) at least one interpolymer of ethylene with at least one α-olefin comonomer, preferably the interpolymer has a molecular weight distribution, $M_w/M_n$, of less than about 3.5, and a composition distribution, as measured by composition distribution breadth index (CDBI) of greater than about 50 percent; and (b) from about 40 to about 95 percent by weight (based on the total weight of the composition) of filler.

Further provided according to the present invention are the above compositions in the form of a sheet or molded part. Included in such sheets are sound-deadening sheets such as those used in automobile doors.

Still further provided according to the present invention are carpets and especially automotive carpets having a backside coating consisting essentially of the above compositions. As used herein, the term "consisting essentially of" means that the named ingredients are essential; however, other ingredients which do not prevent the advantages to the present invention from being realized can also be included (such as small amounts of plasticizer, additives, colorants, etc.).

DETAILED DESCRIPTION OF THE INVENTION

It has been found that use of specific homogeneous ethylene/α-olefin interpolymers having narrow molecular weight distributions and narrow composition distributions in filled blends of ethylene/α-olefin interpolymers and filler allows the preparation of blends containing considerably higher filler levels than can be attained in corresponding binary blends of heterogeneous ethylene/α-olefin interpolymers having broad molecular weight distributions and broader composition distributions and filler.

Flexible, nonexuding blends based on homogeneous ethylene/α-olefin interpolymers containing very high filler levels can be prepared employing certain plasticizers according to the present invention. In contrast, highly filled plasticized blends based solely on either conventional high-density or conventional low-density polyethylene homopolymer or of conventional Ziegler-Natta heterogeneous polyethylene (LLDPE) are of little apparent utility, exhibiting excessive brittleness, poor elongation, and/or plasticizer exudation (when plasticizer is included).

A mixture of two or more ethylene interpolymers can also be used in the blends of the present invention in place of a single interpolymer. Blends can be selected to exhibit a combination of tensile properties and flexibility well suited for use as a sound-deadening sheet or for use as carpet backing. Stiffer blends can be obtained by reducing the comonomer content in the interpolymer. However, as comonomer content is reduced, elongation decreases and plasticizer compatibility problems arise.

Generally, when no other components are added, from about 5 to about 60% by weight of ethylene/α-olefin interpolymer is employed in the composition of the present invention, preferably from about 15 to about 40% by weight, more preferably from about 20 to about 30% by weight, and most preferably about 25% by weight.

Both homogeneously branched linear and substantially linear ethylene/alpha-olefin interpolymers can be used in the compositions provided that they have the appropriate molecular weight distribution and composition distribution.

The substantially linear ethylene/α-olefin polymers can be characterized as having:

a) a melt flow ratio, $I_{10}/I_2, \geq 5.63$, b) a molecular weight distribution, $M_w/M_n$, defined by the equation: $M_w/M_n \leq (I_{10}/I_2) - 4.63$, and c) a critical shear rate at onset of surface melt fracture of at least 50 percent greater than the critical shear rate at the onset of surface melt fracture of a linear olefin polymer having a $I_2$, $M_w/M_n$, and density, each of which is within 10 percent of that of the substantially linear ethylene interpolymer.

The substantially linear ethylene/α-olefin polymer can also be characterized as having:

a) a melt flow ratio, $I_{10}/I_2, \geq 5.63$, b) a molecular weight distribution, $M_w/M_n$, defined by the equation: $M_w/M_n \leq (I_{10}/I_2) - 4.63$, and c) a processing index (PI) less than or equal to about 70% of the PI of a linear olefin polymer having a $I_2$, $M_w/M_n$, and density, each of which is within 10 percent of that of the substantially linear ethylene interpolymer.

The term "linear ethylene/α-olefin polymers" means that the olefin polymer does not have long chain branching. That is, the linear ethylene/α-olefin polymer has an absence of long chain branching, as for example the linear low density polyethylene polymers or linear high density polyethylene polymers made using uniform branching (i.e., homogeneously branched) distribution polymerization processes (e.g., U.S. Pat. No. 3,645,992 (Elston), the disclosure of which is incorporated herein by reference) and are those in which the comonomer is randomly distributed within a given interpolymer molecule and wherein substantially all of the interpolymer molecules have the same ethylene/comonomer ratio within that interpolymer. The term "linear ethylene/α-olefin polymers" does not refer to high pressure branched polyethylene which is known to those skilled in the art to have numerous long chain branches. Typically, the linear homogeneously branched ethylene/α-olefin polymer is an ethylene/α-olefin interpolymer, wherein the α-olefin is at least one $C_3-C_{20}$ α-olefin (e.g., propylene, 1-butene, 1-pentene, 4-methyl-1-pentene, 1-hexene, 1-octene and the like), preferably at least one $C_5-C_{20}$ alpha-olefin, especially wherein at least one of the α-olefins is 1-octene. Most preferably, the ethylene/α-olefin interpolymer is a copolymer of ethylene and a $C_3-C_{20}$ α-olefin, especially an ethylene/$C_5-C_{20}$ α-olefin copolymer, most preferably an ethylene/$C_7-C_{20}$ α-olefin copolymer.

The substantially linear ethylene/α-olefin interpolymers used in the present invention are not in the same class as traditional linear ethylene/α-olefin polymers (e.g., heterogeneously branched linear low density polyethylene, linear high density polyethylene, or homogeneously branched linear polyethylene), nor are they in the same class as traditional highly branched low density polyethylene. The substantially linear olefin polymers useful in this invention surprisingly have excellent processability, even though they have relatively narrow molecular weight distributions. Even more surprising, the melt flow ratio ($I_{10}/I_2$) of the substantially linear olefin polymers can be varied essentially independently of the polydispersity index (i.e., molecular weight distribution ($M_w/M_n$)). This is contrasted with conventional heterogeneously branched linear polyethylene resins having rheological properties such that as the polydispersity index increases, the $I_{10}/I_2$ value also increases.

The term "substantially linear" ethylene/α-olefin polymers means that the polymer backbone has long chain branching and is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

The substantially linear ethylene/α-olefin polymers and interpolymers of the present invention are herein defined as in U.S. Pat. Nos. 5,272,236 and in 5,278,272, the disclosures of which are each incorporated herein by reference. The substantially linear ethylene/α-olefin polymers and interpolymers useful in the inventive compositions are those in which the comonomer is randomly distributed within a given interpolymer molecule and wherein substantially all of the interpolymer molecules have the same ethylene/comonomer ratio within that interpolymer. Both the homogeneously branched linear and the substantially linear ethylene/α-olefin polymers and interpolymers also have a single melting peak, as opposed to heterogeneously branched linear ethylene polymers, which have two or more melting peaks.

Long chain branching is defined herein as a chain length of at least 6 carbons, above which the length cannot be distinguished using $^{13}C$ nuclear magnetic resonance spectroscopy. The long chain branch can be as long as about the same length as the length of the polymer back-bone. However, the long chain branch is longer than the short chain branch resulting from incorporation of the comonomer. For example, an ethylene/1-octene long chain branched copolymer will have a short chain branch length of six carbons and a long chain branch length of at least seven carbons.

Long chain branching can be determined for ethylene homopolymers and certain copolymers by using $^{13}C$ nuclear magnetic resonance (NMR) spectroscopy and is quantified using the method of Randall (*Rev. Macromol. Chem. Phys.*, C29 (2&3), p. 285–297), the disclosure of which is incorporated herein by reference.

The homogeneous linear ethylene/α-olefin polymers and the substantially linear ethylene/α-olefin polymers or copolymers for use in the present invention are interpolymers of ethylene with at least one $C_3$–$C_{20}$ α-olefin and/or $C_4$–$C_{18}$ diolefins. Copolymers of ethylene and 1-octene are especially preferred. The term "interpolymer" is used herein to indicate a copolymer, or a terpolymer, or the like. That is, at least one other comonomer is polymerized with ethylene to make the interpolymer.

Other unsaturated monomers usefully copolymerized with ethylene include, for example, ethylenically unsaturated monomers, conjugated (e.g., piperylene) or nonconjugated dienes (e.g., ethylidene norbornadiene), polyenes, etc. Preferred comonomers include the $C_3$–$C_{20}$ α-olefins especially propene, isobutylene, 1-butene, 1-hexene, 4-methyl-1-pentene, and 1-octene.

The density of the linear or substantially linear ethylene/α-olefin interpolymers or copolymers (as measured in accordance with ASTM D-792) for use in the present invention is generally from about 0.85 g/cm³ to about 0.92 g/cm³, preferably from about 0.86 g/cm³ to about 0.90 g/cm³, more preferably from about 0.865 g/cm³ to about 0.89 g/cm³, and especially from about 0.865 g/cm³ to about 0.88 g/cm³.

Other preferred comonomers (with ethylene) include styrene, halo- or alkyl substituted styrenes, tetrafluoroethylene, vinylbenzocyclobutane, 1,4-hexadiene, and naphthenics (e.g., cyclopentene, cyclohexene and cyclooctene).

Generally and depending upon the filler density, the amount of the linear or substantially linear ethylene/α-olefin polymer incorporated into the composition is from about 5 percent to about 60 percent, by weight of the composition, preferably about 15 percent to about 40 percent, by weight of the composition, more preferably from about 20 percent to about 30 percent, by weight of the composition, and especially about 25 percent, by weight of the composition.

The molecular weight of the linear or substantially linear ethylene/α-olefin polymers for use in the present invention is conveniently indicated using a melt index measurement according ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the linear or substantially linear ethylene/α-olefin polymers useful herein is generally from about 0.01 grams/10 minutes (g/10 min) to about 1000 g/10 min, preferably from about 1 g/10 min to about 100 g/10 min, and especially from about 5 g/10 min to about 100 g/10 min.

Another measurement useful in characterizing the molecular weight of the linear or the substantially linear ethylene/α-olefin polymers is conveniently indicated using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene/α-olefin polymers is preferably at least about 7, especially at least about 8. The upper $I_{10}/I_2$ ratio of the substantially linear ethylene/α-olefin polymers is preferably as high as about 50, especially as high as about 15. The $I_{10}/I_2$ ratio of the linear homogeneously branched ethylene/α-olefin polymers is generally about 6.

Fillers which are useful in the formulations include talc, carbon black or graphite, calcium carbonate, flyash, cement dust, clay, feldspar, nepheline, silica or glass, fumed silica, alumina, magnesium oxide, zinc oxide, barium sulfate, aluminum silicate, calcium silicate, titanium dioxide, titanates, glass microspheres, chalk. Of these fillers, barium sulfate, talc, calcium carbonate, silica/glass, alumina and titanium dioxide, and mixtures thereof, are preferred; of these, calcium carbonate and barium sulfate are most preferred.

Ignition resistance fillers which can be used in the formulations include antimony oxide, decabromobiphenyl oxide, alumina trihydrate, magnesium hydroxide, borates, and halogenated compounds. Of these ignition resistant fillers, alumina trihydrate and magnesium hydroxide are preferred. Other miscellaneous fillers include wood fibers/flours/chips, ground rice hulls, cotton, starch, glass fibers, synthetic fibers (e.g., polyolefin fibers), and carbon fibers.

The level of the filler depends upon the filler density; the higher the filler density, the more of it which can be added to the formulation without appreciably affecting the volume fraction of that filler. Accordingly, the level of the filler is discussed herein in terms of weight percent filler, based on the total formulation weight.

Other additives such as antioxidants (e.g., hindered phenolics (e.g., Irganox® 1010 made by Ciba Geigy Corp.), phosphites (e.g., Irgafos® 168 made by Ciba Geigy Corp.), cling additives (e.g., polyisobutylene (PIB)), antiblock additives, pigments, colorants, and the like can also be included in the formulations, to the extent that they do not interfere with the enhanced formulation properties discovered by Applicants.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1 L/D die with an entrance angle of 180°. For the substantially linear ethylene/α-olefin polymers described herein, the PI is the apparent viscosity (in kpoise) of a material measured by GER at an apparent shear stress of $2.15 \times 10^6$ dyne/cm$^2$. The novel substantially linear ethylene/(α-olefin polymers described herein preferably have a PI in the range of about 0.01 kpoise to about 50 kpoise, preferably about 15 kpoise or less. The novel substantially linear substantially linear ethylene/α-olefin polymers described herein have a PI less than or equal to about 70% of the PI of a comparative linear ethylene/α-olefin polymer having a $I_2$, $M_w/M_n$, and density, each of which is within 10 percent of that of the substantially linear ethylene interpolymer.

An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture (OSMF) is characterized at the beginning of losing extrudate gloss at which the surface roughness of extrudate can only be detected by 40× magnification. The critical shear rate at onset of surface melt fracture for the substantially linear ethylene/(α-olefin polymers is at least 50 percent greater than the critical shear rate at the onset of surface melt fracture of a linear ethylene/α-olefin polymer having a $I_2$, $M_w/M_n$, and density, each of which is within 10 percent of that of the substantially linear ethylene interpolymer.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

Both the linear and substantially linear ethylene/α-olefin polymers useful for forming the compositions described herein have homogeneous branching distributions. That is, the polymers are those in which the comonomer is randomly distributed within a given interpolymer molecule and wherein substantially all of the interpolymer molecules have the same ethylene/comonomer ratio within that interpolymer. The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), in U.S. Pat. No. 5,008,204 (Stehling), in U.S. Pat. No. 5,246,783 (Spenadel et al.), in U.S. Pat. No. 5,322,728 (Davey et al.), in U.S. Pat. No. 4,798,081 (Hazlitt et al.), or in U.S. Pat. No. 5,089,321 (Chum et al.) the disclosures of all of which are incorporated herein by reference. The SCBDI or CDBI for the linear and for the substantially linear olefin polymers used in the present invention is greater than about 50 percent, preferably greater than about 60 percent, more preferably greater than about 70 percent and especially greater than about 90 percent. Blends (either "in situ reactor" blend or discrete polymer blends) of homogeneously branched linear or substantially linear ethylene polymer with heterogeneously branched polyethylene are also suitable as long as the blends meet the CDBI and molecular weight distribution limits defined herein.

The homogeneous ethylene/α-olefin polymers used in this invention essentially lack a measurable "high density" fraction as measured by the TREF technique (i.e., the homogeneous ethylene/α-olefin polymers do not contain a polymer fraction with a degree of branching less than or equal to 2 methyls/1000 carbons). The homogeneous ethylene/α-olefin polymers also do not contain any highly short chain branched fraction (i.e., the homogeneous ethylene/α-olefin polymers do not contain a polymer fraction with a degree of branching equal to or more than 30 methyls/1000 carbons).

Molecular Weight Distribution Determination of the Linear or Substantially Linear Ethylene/α-Olefin Polymers The linear and substantially linear ethylene/a-olefin interpolymer product samples are analyzed by gel permeation chromatography (GPC) on a Waters 150 C. high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968, incorporated herein by reference) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the $i^{th}$ fraction eluting from the GPC column.

For the linear and substantially linear ethylene/α-olefin interpolymers, the $M_w/M_n$ is less than about 3.5, preferably from about 1.5 to about 2.5.

The Substantially Linear Ethylene/α-Olefin Polymers

The substantially linear ethylene/α-olefin interpolymers are made by using suitable constrained geometry catalysts, preferably constrained geometry catalysts as disclosed in U.S. application Ser. No. 545,403, filed Jul. 3, 1990; U.S. Pat. Nos. 5,132,380; 5,064,8302; 5,153,157; 5,470,993; 5,453,410; 5,374,696; 5,532,394; 5,494,874; 5,189,192; the teachings of all of which are incorporated herein by reference. The monocyclopentadienyl transition metal olefin polymerization catalysts taught in U.S. Pat. No. 5,026,798, the teachings of which are incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane or modified methyl aluminoxane (made, e.g., as described in U.S. Pat. Nos. 5,041,584, 4,544,762, 5,015,749, and/or 5,041,585, the disclosures of each of which are incorporated herein by reference) as well as inert, compatible, noncoordinating, ion forming compounds. Preferred cocatalysts are inert, noncoordinating, boron compounds.

Preparation of the Substantially Linear Ethylene/α-Olefin Polymer

The polymerization conditions for manufacturing the substantially linear ethylene/α-olefin polymers of the present invention are generally those useful in the solution polymerization process, although the application of the present invention is not limited thereto. Slurry, gas phase and high pressure polymerization processes are among the processes also believed to be useful, provided the proper catalysts and polymerization conditions are employed.

Multiple reactor polymerization processes can also be used in making the homogeneous substantially linear or linear olefin polymers and copolymers (or blends incorporating such homogeneous polymers) used in the present invention, such as those disclosed in U.S. Pat. No. 3,914,342, incorporated herein by reference. The multiple reactors can be operated in series or In parallel, with at least one constrained geometry catalyst (or single site catalyst) employed in one of the reactors to produce the homogeneous polymer.

The plasticizer ingredient, when used In the present invention, can be selected from one of several groups. The first group is the group known as processing oils. Three types of processing oils are known-paraffinic, aromatic, and naphthenic. None of these are pure; the grades identify the major oil-type present. Aromatic oils tend to "bleed" from the blends of the present invention. Bleeding is normally not desirable, but could be useful in specialty application, for example, in concrete forms where mold release characteristics are valued.

Naphthenic and paraffinic oils are non-bleeding in the formulations of the present invention when used in proper ratios and are this preferable for uses such as automotive carpet backing.

Processing oils are also subdivided by viscosity range. "Thin" oils can be as low as 100–500 SUS (Saybolt Universal Seconds) at 100° F. (38° C.) "Heavy" oils can be as high as 6000 SUS at 100° F. (38° C.) Processing oils, especially naphthenic and paraffinic oils with viscosity of from about 100 to 6000 SUS at 100° F. (38° C.) are preferred.

The second group of plasticizers that are effective, when used in the practice of the present invention, is the group comprising epoxidized oils such as epoxidized soybean oil and epoxidized linseed oil.

The third group of plasticizers that are effective, when used in the practice of the present invention, are polyester which, in general are liquid condensation products of a polybasic acid and a polyol. The term "liquid" in the context of the present invention is used to mean pourable at room temperature. The acid component is most often a saturated aliphatic dibasic acid, or an aromatic dibasic acid, adipic acid, azelaic acid, phthalic acid, sebacic acid, and glutaric acid, or mixtures of these acids are commonly used. The polyol can be an aliphatic polyol or a poly-oxyalkylene polyol, such as ethylene glycol, propylene glycol, 1,4- and 1,3-butane glycol, diethylene glycol, and polyethylene glycol. Preferred polyester compositions would consist of an acid component of which greater than 50% by weight are aliphatic polyol or even more preferably aliphatic glycol. Most preferred compositions are based on adipic or azelaic acid, and propylene glycol or the 1,3- or 1,4- butane glycol. The molecular weight of these plasticizers can vary from a low of a few hundred up to a high of about 10,000. The molecular weight of commercial products is seldom specified; however, typically in the trade, the molecular weight range of the product is classified as low, medium, or high. The preferred range for purposes of this invention is that classified as medium.

Mixtures of polyester or epoxidized oils with hydrocarbon oils are also effective plasticizers if and when used in the present invention. One objective of using such a mixture is to couple the high efficiency of the relatively high cost polyester or epoxidized oil with the low cost of the hydrocarbon oil. The cost/performance of a compound plasticized with such a mixture can be improved significantly for a given application because properties can be tailored more precisely, or filler levels can be increased. Actually certain advantages in the performance of the blends of the present invention are obtained as will be discussed below, when such a mixture is used as the plasticizer.

In general, both the epoxidized oils and the polyesters are more "efficient" than processing oils in plasticizing filled ethylene/α-olefin interpolymers; i.e., when used at the same weight percent, they produce blends that are more flexible and have higher percent elongation than the corresponding blends containing processing oil as the plasticizer.

Where a mixture of the polyester plasticizer and a hydrocarbon oil is employed, the relative proportions of the two components can be varied over a wide range depending upon performance objectives. Mixtures containing 50% or less of the polyester are preferred for economic reasons, and most preferred are those containing 20% or less if the polyester.

A fourth group of plasticizers, polyethers and polyether esters, are also effective plasticizers, if used in blends of the ethylene/α-olefin interpolymers and fillers of the present invention. In general, polyethers are oligomers or polymers of alkylene oxides, polymers of ethylene or propylene oxide are the most common types available commercially. Polyethers can be prepared by polymerization of aldehydes using various types of catalysts, or by acid or base catalyzed polymerization of an alkylene oxide, for example. Polyethers can be terminated by hydroxyl groups to form the diol (glycol) or, in the case of adducts of alkylene oxides with glycerol, for example, the triol, and so forth. The hydroxyl terminated polyether can also be reacted with an acid, fatty acids such as lauric and stearic acids are common examples of the compounds are the mono-and diesters of polyethylene or polypropylene glycol. The molecular weight of polyethers may range up to those typical of high polymers.

Preferred polyether compositions in the practice of this invention are those consisting of polyols based on random and/or block copolymers of ethylene oxides and propylene oxides. The copolymer polyols provide better performance in terms of efficiency in compounds of the present invention containing very high levels of filler.

Mixture of the polyether or the polyether ester plasticizers with either a polyester plasticizer or a hydrocarbon processing oil can also be used in the practice of this invention. The advantage of polyether/polyester combination is the lower cost since the polethers are cheaper than the polyesters. Combinations of polyether and processing oil are also cheaper because of the lower cost of the oil.

The reactive portions of the two components in a polyether/polyester combination will be adjusted according to the efficiency of the system based on property requirements and cost. Those based on polyester primarily will not be as stiff and will be more expensive, for example, than those based primarily on a polether or polyether ester.

Where a mixture of the polyether or polyether ester and a hydrocarbon oil is employed, the relative proportions used will again depend on cost and property requirements. Since the polyethers are more expensive than the processing oils, mixtures containing 50% or less of the polyethers are preferred.

As referred to above, a mixture of processing oil, on the one hand, and epoxidized oil or polyester or polyether or polyether ester, or any combination thereof, on the other hand, can also be used very effectively as the plasticizer for the compositions of the present invention. In fact, such a two- or more component plasticizer system, comprising from about 50 to about 95 percent by weight of processing oil, gives higher tensile elongation than can be obtained using either plasticizer alone at the same level. Maximum elongation is achieved using a mixture of processing oil and polyester or polyether or polyether ester or any combination thereof comprising from about 50 to about 80 percent by weight of processing oil.

The amount of plasticizer(s), if used in the composition of the present invention, is typically from about 2 to about 12% by weight of the total formulation, preferably from about 3 to about 10% by weight of the total formulation. Most preferably the amount of plasticizer is from about 3 to about 8% by weight of the total formulation.

The percentage of filler that can be include in the composition of the present invention on a weight basis is primarily a function of the density of the filler. Particle size of the filler has some effect. Fine particle size fillers generally have a tendency to result in higher blend viscosities, and they are also more expensive. The use of fine filler, especially at high filler loading, results in a smoother extrudate surface when molten blend is extruded through a die orifice. The attendant benefits of using fine particle size filler in filled polymer blends are described in U.S. Pat. No. 4,263,196, the disclosure of which is hereby incorporated by reference. Calcium carbonate, which has been used extensively in the present compositions, had a particle size of about 12 micron.

Most preferably, when using a filler of medium density, such as calcium carbonate or hydrated alumina, the amount of filler is from about 65 to about 95% by weight, and when using a filler of higher density, such as barium sulfate, the amount of filler is from about 70 to about 95% by weight.

Hydrated alumina can also be used as the filler to obtain blends which are flame retardant.

Polymers, both homo- and interpolymers, other than the one referred to above, can also be used to some extent in combination with the above specified polymers without significantly interfering with the advantages obtained by the present invention. Similarly, other ingredients can also be added to the compositions of the present invention by a compounder in order to obtain some desired effect, such as reduction of cost, or enhancement of physical properties. Accordingly, extender or modifying resins, waxes, foaming agents, crosslinking agents, antioxidants, flame retardant agents, tackifying resins, etc. that are widely used, can be included in the compositions of the present invention.

Other polymers, including other elastomeric polymers, which can be added to the polymer component of the formulations in minor amounts (i.e., less than 50 percent of the polymer component) include an elastomer or a mixture of elastomers. Mooney viscosity of the elastomer is preferably in the range of from 20 to 100. Thermoplastic elastomers (e.g. ethylene-propylene rubber, styrene-butadiene-styrene, polyurethane, etc.) or vulcanizable elastomers (e.g., styrene-butadiene rubber, ethylene/propylene/diene terpolymer (EPDM) such as Vistalon* made by Exxon Chemical or Nordel* made by DuPont Dow Elastomers L.L.C.), chiorosulfonated polyethylene, chlorinated polyethylene such as Tyrin* made by DuPont Dow Elastomers L.L.C., etc. can be used.

The blends of the present invention are thermoplastic in nature and therefore can be recycled after processing. The recycled material may also contain textile fibers, jute, etc. present in the trim obtained during production of the finished product (e.g., back-coated automotive carpet) and the entire mixture can be placed back into a virgin backing sound deadening layer.

A commercially sized batch-type Banbury or equivalent intensive mixer is entirely suitable for preparing the compositions of the present invention. A Farrel continuous mixer ("FCM") is also an excellent mixing device. In either instance, dry ingredients are charged in routine fashion. It is convenient in most cases to inject the plasticizer component directly into the mixing chamber of either unit as per widely used practice with this type of equipment. When more than one plasticizer is used, and where any one of the plasticizers is present in a small amount (less than about 10 weight percent of the total plasticizer mixture), the plasticizer should be preblended before addition to the other ingredients of the present invention. This will facilitate uniform distribution of each plasticizer component in the final composition and thus ensure that optimum properties are obtained. If desired, the interpolymer and the plasticizer(s) can be pre-compounded as a "Master batch" in a suitable intensive mixing device (e.g., Banbury mixer or screw extruder). This "Master batch" can then be compounded with the filler and the other remaining ingredients to produce the final composition. A mix cycle of about 3 minutes is generally adequate for the Banbury mixer at an opening room temperature usually between 325° and 375° F. The operating rate for the FCM unit generally will fall within ranges predicted by literature prepared by the Farrel Company, Ansonia, Conn. Again, temperatures between 325° and 375° F. are effective. In both cases, a very low plasticizer level, say about 2–3%, may require higher temperatures, while plasticizer levels above about 7% may mix well at lower mixer temperatures.

Once blends are mixed, routine commercial practices may be used, such as underwater melt cutting plus drying or use of sheeting plus chopping methods, to produce a final pelletized product.

Primary use for the compositions of the present invention will probably be in the sheeting field, particularly for low-cost, dense, sound deadening structures. Outstanding characteristics such as improved "hand", "drape," reduced stiffness, and reduced thickness of the extruded sheeting result form the compositions of the present invention.

The blends of the present invention can readily be extruded onto a substrate, such as an automotive carpet, or can be extruded or calendered as unsupported film or sheet. Depending on the equipment used, and the compounding techniques employed, it is possible to extrude wide ranges of film thickness, from below 20 mils to above 100 mils. This then provides industry with an opportunity to vary the amount of sound deaden ng to be attained by varying film thickness, density of blends, ratio of filler load to binder, and similar techniques well known in the art.

The sound-deadening sheet produced may be used in various ways:

When applied to automotive carpet, blends described are an effective and economic means to deaden sound, while also simultaneously serving as a moldable support for the carpet.

When used in sheet form, the blends can be installed in other areas of an automobile, truck, bus, etc., such as side panels, door panels, roofing areas, etc.

In sheet form, blends may be used as drapes or hanging to shield or to surround a noisy piece of factory equipment such as a loom, a forging press, etc.

In laminated sheet form (including coextruded structures), blends, faced with another material, might be used to achieve both a decorative and a functional use, such as dividing panels in an open-format office.

The application of the compositions of the present invention in construction material such as flooring, carpets, and particularly in automotive carpets, is essentially identical to the methods as already described in U.S. Pat. No. 4,191,798, the disclosure of which is hereby incorporated by reference.

The following examples are given for the purpose of illustrating the present invention. All parts and percentages are by weight unless otherwise specified.

The following examples of the present invention involve blending non-functional, ethylene/alpha-olefin interpolymers having a narrow molecular weight distribution and narrow composition distribution, fillers (such as calcium carbonate and/or barium sulfate) and colorants/stabilizers when desired. The result is (1) a blendable/fluxable system (i.e., a uniformly blended system) not possible with conventional non-functional, heterogeneous ethylene alpha-olefin interpolymers, (2) an oil-less system that eliminates a fogging problem with current plasticized systems and (3) a composition with an excellent balance of physical properties and processability allowing it to be extrusion coated or cast into a thermoformable sheet for uses like sound-deadening sheet or injection molded into a useful part.

The following samples are all mixed on a 1500 gram capacity, Farrel Banbury with counter-rotating rotors. Cooling water is run through the rotors and the chamber is heated with 40 psi steam. Each mix batch is calculated to fill the chamber to 75% for ample mixing potential. Polymer and filler are added first and mixed at approximately 225 rpm until a 275–300° F. temperature is reached. The mix is then allowed to homogenize at 225 rpm for an additional minute. If required, the oil is now added and blended for an additional two minutes, holding the temperature at 275–300° F. by adjusting the rotor rpm. The discharge is passed through a roll mill three times to produce a filled polymer sheet that is subsequently ground into a flake. The flake is comoression molded and tested via ASTM procedures.

TABLE I

| PRODUCT | Density (g/cm$^3$) | RUN 1 (wt % of total) | RUN 2 (wt % of total) | RUN 3 (wt % of total) | RUN 4 (wt % of total) | RUN 5 (wt % of total) | RUN 6 (wt % of total) | RUN 7 (wt % of total) | RUN 8 (wt % of total) | RUN 9 (wt % of total) | RUN 10 (wt % of total) |
|---|---|---|---|---|---|---|---|---|---|---|---|
| ENGAGE* EG 8200 | 0.87 | 20 | 15 | 10 | 7 | 0 | 18.75 | 18.75 | 0 | 0 | 12.5 |
| ENGAGE** SM 8400 | 0.87 | 0 | 0 | 0 | 0 | 0 | 25 | 0 | 0 | 0 | 0 |
| TAFMER*** P-0480 (1.1 MI) | 0.87 | 0 | 0 | 0 | 0 | 0 | 0 | 0 | 25 | 0 | 0 |
| DOWLEX ™ 2045 (1 MI) | 0.92 | 0 | 0 | 0 | 0 | 0 | 6.25 | 0 | 0 | 0 | 0 |
| SUNPAR**** 2280 (oil) | 0.89 | 0 | 0 | 0 | 3 | 0 | 0 | 0 | 0 | 0 | 0 |
| BaSO$_4$ | 4.4 | 80 | 85 | 90 | 90 | 75 | 75 | 75 | 75 | 85 | 75 |
| EVA, 18% VA | 0.935 | 0 | 0 | 0 | 0 | 0 | 0 | 0 | 0 | 15 | 12.5 |
| TOTAL | | 100 | 100 | 100 | 100 | 100 | 100 | 93.75 | 100 | 100 | 100 |
| SPECIFIC GRAVITY OF MIX | | 2.429 | 2.735 | 3.130 | 2.828 | 2.184 | 2.203 | 2.429 | 2.184 | 2.828 | 2.233 |

ENGAGE* EG 8200 is a substantially linear ethylene/1-octene copolymer having I$_2$ of 5 g/10 minutes and being a trademark of The Dow Chemical Company ENGAGE SM 8400 is a substantially linear ethylene/1-octene copolymer having I$_2$ of 30 g/10 minutes and being a trademark of The Dow Chemical Company DOWLEX ™ is a heterogeneous ethylene/1-octene copolymer being a trademark of and made by The Dow Chemical Company SUNPAR is a trademark of and made by Sun Oil Company TAFMER* P-0480 is a homogeneous linear ethylene/propene copolymer being a trademark of and made by Mitsui Petrochemical

TABLE II

| PROPERTIES | ASTM | RUN 1 (wt % of total) | RUN 2 (wt % of total) | RUN 3 (wt % of total) | RUN 4 (wt % of total) | RUN 5 (wt % of total) | RUN 6 (wt % of total) | RUN 7 (wt % of total) | RUN 8 (wt % of total) | RUN 9 (wt % of total) | RUN 10 (wt % of total) |
|---|---|---|---|---|---|---|---|---|---|---|---|
| Ultimate tensile, psi at 2 in./min | D-638 | 555 (11) | 403 (57) | 540 (60) | 260 (22) | 244 (4) | 610 (24) | 550 (11) | 260 (10) | 920 (31) | 584 (9) |
| Yield, psi | D-638 | 331 (21) | 418 (38) | 500 (100) | 240 (11) | 240 (33) | 460 (20) | 335 (12) | 311 (12) | 923 (25) | 630 (13) |
| Elongation, percent | D-638 | 996 (18) | 74 (46) | 3.0 (.8) | 3.4 (.3) | 100 (17) | 750 (26) | 970 (22) | 69 (20) | 3.6 (.1) | 422 (50) |
| Density, g/cm$^3$ at 23° C. | D-792 | 2.3682 (.0008) | 2.669 (.0004) | 3.0487 | 3.0741 | 2.1687 | 2.1433 | 2.3625 | 2.1448 | 2.7889 | 2.2163 |
| 2% Secant mod., M psi | D-790 | 9.5 (.3) | 14.2 (.4) | 28 (1) | 11 (1) | 6.9 (.2) | 17.9 (.6) | 10.0 (.5) | 6.54 (.07) | 62 (2) | 21.9 (.5) |
| Flex. Modulus M psi | D-790 | 13.6 (.9) | 23.2 (1) | 69.7 (1.2) | 26.9 (4.8) | 10.8 (1.7) | 31.3 (1.3) | 15.1 (2.9) | 8.8 (.3) | 128 (7) | 33.4 (1.4) |
| Melt index, g/10 minutes at 190° C. | D-1238 | 1.5 | 0.08 | 0 | 0.07 | 16 | 2.1 | 1.6 | 0.5 | 0.5 | 1.6 |
| Gull wing tear lbs/inch | D-1004 | 132 (.8) | 115 (3) | 80 (3.5) | 44 (2) | 76 (7) | 166 (2) | 130 (1) | 82 (5) | 128 (6) | 147 (6) |
| Brittleness point ° C. | D-746 | >−20 | >−20 | >−20 | >−20 | >−20 | >−20.8 | >−20 | >−20 | >−20 | >−20 |
| Izod imp., RT ft-lbs/inch | D-256 | 2.8 (.4) | 2.7 (.2) | 1.15 (.08) | 2.2 (.2) | 2.6 (.1) | 3.8 (.1) | 3.0 (.2) | 2.7 (.3) | 4.7 (.5) | |
| Izod imp., 0° C. ft-lbs/inch | D-256 | 4.7 (.4) | 1.3 (.1) | 0.56 (.03) | 1.7 (.5) | 4.8 (.7) | 4.7 (.2) | 5.8 (.4) | 4.0 (.3) | 0.63 (.08) | 2.46 (.05) |
| Izod imp., −20° C. ft-lbs/inch | D-256 | 1.3 (.1) | 0.7 (.1) | — | — | — | — | — | 6.0 (.7) | 0.55 (.07) | 1.6 (.1) |
| Izod imp., −30° C. ft-lbs/inch | D-256 | — | — | .49 (.1) | 0.4 (.1) | 1.4 (.1) | 0.8 (.1) | 1.1 (.1) | 1.6 (.4) | | — |
| Izod imp., −50° C. ft-lbs/inch | D-256 | 0.75 (.05) | 1.7 (.03) | .59 (.02) | — | — | 4.7 (.2) | — | 4.0 (.3) | 0.53 (.06) | 0.9 (.4) |

Note: the numbers in the parentheses indicate one standard deviation
A "—" indicates not tested

TABLE III

| PROPERTIES | RUN 1 | RUN 2 | RUN 3 | RUN 4 | RUN 5 | RUN 6 | RUN 7 | RUN 8 | RUN 9 | RUN 10 |
|---|---|---|---|---|---|---|---|---|---|---|
| Cap. Rheology (190/230° C.) | | | | | | | | | | |
| .02 in./min. | 127/81 | 165/195 | 1350/1086 | 475/569 | 31/13 | 97/56 | 146/82 | 251/198 | 744/110 | 216/53 |
| .05 in./min. | 237/190 | 511/297 | 2400/1086 | 804/910 | 53/22 | 246/101 | 254/147 | 800/393 | 1031/154 | 397/98 |
| 0.1 in./min. | 480/446 | 825/460 | —/— | —/1102 | 89/44 | 455/202 | 437/255 | —/782 | —/410 | 677/166 |
| 0.2 in./min. | 804/857 | 1390/771 | —/— | —/— | 156/80 | 753/413 | 827/459 | —/1316 | —/653 | 1131/289 |
| 0.5 in./min. | 1505/1299 | 2325/1405 | —/— | —/— | 327/142 | 1299/809 | 1299/936 | —/2460 | —/1147 | 1299/586 |
| 1.0 in./min. | 2185/— | 2760/2325 | —/— | —/— | 552/235 | —/1285 | —/1570 | —/2925 | —/1722 | —/911 |
| 2.0 in./min. | 2815/— | —/— | —/— | —/— | 889/431 | —/1910 | —/2003 | —/— | —/2002 | —/1379 |
| 5.0 in./min. | —/— | —/— | —/— | —/— | 1566/884 | —/2428 | —/— | —/— | —/— | —/2231 |
| 10.0 in./min. | —/— | —/— | —/— | —/— | 2213/1460 | —/2811 | —/— | —/— | —/— | —/2804 |
| 20.0 in./min. | —/— | —/— | —/— | —/— | 2893/2033 | —/— | —/— | —/— | —/— | —/3014 |

The die used is #31 having a L/D of 4.0083 inches/0.05 inches
"—/—" means that the values could not be measured
The two numbers reported represent values obtained at 190/230° C., respectively

TABLE IV

| PRODUCT | Density (g/cm$^3$) | CONTROL 1 | EXAMPLE 1 | EXAMPLE 2 | EXAMPLE 3 | CONTROL 2 | EXAMPLE 4 |
|---|---|---|---|---|---|---|---|
| ENGAGE* EG 8200 | 0.87 | 0 | 25 | 0 | 0 | 0 | 18 |
| ENGAGE** CL 8003 | 0.885 | 0 | 0 | 25 | 0 | 0 | 0 |
| Polymer blend*** having I$_2$ of 0.85 | 0.92 | 0 | 0 | 0 | 25 | 0 | 0 |
| DOWLEX ™ 2045 (1 MI) | 0.92 | 25 | 0 | 0 | 0 | 18 | 0 |
| SUNPAR**** 2280 (oil) | 0.89 | 0 | 0 | 0 | 0 | 7 | 7 |

TABLE IV-continued

| PRODUCT | Density (g/cm³) | CONTROL 1 | EXAMPLE 1 | EXAMPLE 2 | EXAMPLE 3 | CONTROL 2 | EXAMPLE 4 |
|---|---|---|---|---|---|---|---|
| CaCO₃ (12 MICRON) | 2.71 | 75 | 75 | 75 | 75 | 0 | 0 |
| BaSO₄ | 4.4 | 0 | 0 | 0 | 0 | 75 | 75 |
| | TOTAL | 100 | 100 | 100 | 100 | 100 | 100 |
| SPECIFIC GRAVITY OF MIX | | 1.823 | 1.773 | 1.788 | 1.823 | 2.248 | 2.193 |

ENGAGE* EG 8200 is a substantially linear ethylene/1-octene copolymer having $I_2$ of 5 g/10 minutes and being a trademark of The Dow Chemical Company
ENGAGE** CL 8003 is a substantially linear ethylene/1-octene copolymer having $I_2$ of 1 g/10 minutes and being a trademark of The Dow Chemical Company
***The polymer blend comprises about 36.5% of a homogeneously branched substantially linear ethylene/1-octene copolymer having a $I_2$ of about 0.19 g/10 minutes and density of about 0.902 g/cm³ and 63.5% of a heterogeneously branched ethylene/1-octene copolymer having a $I_2$ of about 1.64 g/10 minutes and density of about 0.931 g/cm³
DOWLEX™ is a trademark of and made by The Dow Chemical Company
SUNPAR**** is a trademark of and made by Sun Oil Company

TABLE V

| PROPERTIES | ASTM | CONTROL 1 | EXAMPLE 1 | EXAMPLE 2 | EXAMPLE 3 | CONTROL 2 | EXAMPLE 4 |
|---|---|---|---|---|---|---|---|
| Density g/cm³ at 23° C. | D-792 | did not flux | 1.7614 (.0007) | 1.7887 (.0001) | 1.8234 (.0005) | 2.2126 (.0001) | 2.1735 (.0005) |
| Ultimate tensile, psi at 2 in./min. | D-638 | did not flux | 360 (70) | 690 (110) | 1590 (280) | 718 (14) | 238 (2) |
| Yield, psi | D-638 | did not flux | 490 (50) | 735 (8) | 1580 (280) | 710 (25) | 141 (40) |
| Elongation, percent | D-638 | did not flux | 230 (150) | 40 (60) | 9 (.3) | 6.1 (.1) | 10044 (35) |
| 2% Secant mod. M psi | D-638 | did not flux | 15.3 (.2) | 38.0 (.3) | 130 (4) | 31 (1) | 3.2 (.1) |
| Flex. Modulus M psi | D-790 | did not flux | 26.5 (1.4) | 58.0 (2.4) | 339 (20.6) | 58 (5) | 6.5 (.3) |
| Melt Index, g/10 minutes at 190° C. | D-1238 | did not flux | 0.1 | 0.1 | 0.1 | 1.8 | 10.3 |
| Cap. Rheology (190° C./210° C.) | | | | | | | |
| .02 in./min. | | did not flux | 273/211 | 633/396 | 566/561 | 155109 | 91/50 |
| .05 in./min. | | did not flux | 467/323 | 1112/913 | 1475/1255 | 248/185 | 176/94 |
| 0.1 in./min. | | did not flux | 708/521 | 1800/1550 | 2300/1945 | 362/210 | 294/139 |
| 0.2 in./min. | | did not flux | 1253/908 | 2850/2355 | 2650/2695 | 610/469 | 462/216 |
| 0.5 in./min. | | did not flux | 2290/1790 | >3000/>3000 | <3000/>3000 | 1008/785 | 799/398 |
| 1.0 in./min. | | did not flux | 2945/>3000 | — | — | 1385/1133 | 1156/624 |
| 2.0 in./min. | | did not flux | >3000/>3000 | — | — | 1623/1509 | 1577/941 |
| 5.0 in./min. | | did not flux | — | — | — | 1857/1726 | 1787/1448 |
| 10.0 in./min | | did not flux | — | — | — | 2197/2137 | 2149/1812 |
| 20.0 in./min. | | did not flux | — | — | — | 2391/2334 | 2341/2113 |

The die used is #31 having a L/D of 4.0083 inches/0.05 inches
"did not flux" means that the composition did not form a uniform molten mixture
"—" means that the values could not be measured

What is claimed is:

1. A composition comprising:
    (a) at least one interpolymer of ethylene with at least one α-olefin comonomer, the interpolymer having a molecular weight distribution, $M_w/M_n$, of less than about 3.5 and a composition distribution, as measured by composition distribution breadth index (CDBI) of greater than about 50 percent; and
    (b) from about 85 to about 95 percent of at least one filler based on the total weight of the composition,
    wherein the composition is thermoplastic in nature.

2. The composition of claim 1 wherein (a) said ethylene/α-olefin interpolymer is present in an amount of from about 20 to about 30 percent by weight of the total composition.

3. The composition of claims 1 or 2 wherein the α-olefin comonomer contains from 3 to 20 carbon atoms.

4. The composition of claims 1 or 2 wherein said filler is selected from the group consisting of calcium carbonate, barium sulfate, hydrated alumina, clay, magnesium carbonate, calcium sulfate, silica, flyash, cement dust, wood flour, ground rice hulls and mixtures thereof.

5. The composition of claims 1 or 2 wherein said ethylene/alpha-olefin interpolymer comprises a terpolymer of ethylene with at least one comonomer selected from the group consisting of $C_3$–$C_{20}$ α-olefins and $C_4$–$C_{18}$ diolefins.

6. The composition of claims 1 or 2 wherein at least one comonomer is selected from the group consisting of propene, isobutylene, 1-butene, 1-hexene, 4-methyl-1-pentene, and 1-octene.

7. The composition of claims 1 or 2 wherein at least one comonomer is 1-octene.

8. An article comprising a sound deadening sheet prepared from a composition comprising the composition of claims 1 or 2.

9. An article comprising a carpet having a backside coating prepared from a composition comprising the composition of claim 1, wherein said ethylene/α-olefin copolymer is provided in an amount of from about 15 to about 40 weight percent of the composition and has a density of from about 0.86 to about 0.90 g/cm³.

10. A fabricated article comprising the composition of claims 1 or 2.

11. The composition of claims 1 or 2 wherein said ethylene/α-olefin interpolymer has a density of from about 0.85 to about 0.92 g/cm³.

12. The composition of claims 1 or 2 wherein said ethylene/α-olefin interpolymer has a density of from about 0.86 to about 0.90 g/cm³.

13. The composition of claims 1 or 2 wherein said ethylene/α-olefin interpolymer is a substantially linear ethylene/α-olefin interpolymer characterized as having:
  a. a melt flow ratio, $I_{10}/I_2, \geq 5.63$,
  b. a molecular weight distribution, $M_w/M_n$, defined by the equation:

$$M_w/M_n \leq (I_{10}/I_2) - 4.63, \text{ and}$$

c. a critical shear rate at onset of surface melt fracture of at least 50 percent greater than the critical shear rate at the onset of surface melt fracture of a linear polymer or a processing index (PI) less than or equal to about 70% that of a linear olefin polymer,
wherein the linear polymer has a $I_2$, $M_w/M_n$, and density, each of which is within 10 percent of that of the substantially linear ethylene interpolymer.

14. The composition of claim 1, further comprising at least one ingredient selected from the group consisting of plasticizers, additives, and colorants.

15. The composition of claim 14, wherein the at least one ingredient is a plasticizer selected from the group consisting of processing oils, epoxidized oils, polyesters, polyethers, polyether esters, and combinations thereof.

16. The composition of claim 14, wherein the at least one ingredient is a plasticizer which is provided in an amount of from about 2 to about 12 percent by weight of the total composition.

17. A composition comprising:
  (a) at least one interpolymer of ethylene with at least one α-olefin comonomer, the interpolymer having a molecular weight distribution, $M_w/M_n$, of less than about 3.5 and a composition distribution, as measured by composition distribution breadth index (CDBI) of greater than about 50 percent; and
  (b) from about 40 to about 95 percent of at least one filler based on the total weight of the composition;
  wherein the composition is thermoplastic in nature, and absent a plasticizer.

18. The composition of claim 17 wherein the filler is present in an amount from about 75 percent to about 95 percent by weight of the total composition.

19. A composition comprising:
  (a) at least one interpolymer of ethylene with at least one α-olefin comonomer, the interpolymer having a molecular weight distribution, $M_w/M_n$, of less than about 3.5 and a composition distribution, as measured by composition distribution breadth index (CDBI) of greater than about 50 percent; and
  (b) from about 75 to about 95 percent of at least one filler based on the total weight of the composition;
  wherein the composition is thermoplastic in nature, and absent a plasticizer.

20. A composition comprising:
  (a) at least one interpolymer of ethylene with at least one α-olefin comonomer, the interpolymer having a molecular weight distribution, $M_w/M_n$, of less than about 3.5 and a composition distribution, as measured by composition distribution breadth index (CDBI) of greater than about 50 percent; and
  (b) from about 85 to about 95 percent of at least one filler based on the total weight of the composition;
  wherein the composition is thermoplastic in nature, and absent a plasticizer.

* * * * *